Keith H. Clark
James V. Johnston,
INVENTORS.

Sept. 1, 1964  K. H. CLARK ETAL  3,146,530
PENDULOUS NORTH SEEKING GYROSCOPIC ASSEMBLY
Filed Oct. 2, 1961  3 Sheets-Sheet 3

Keith H. Clark
James V. Johnston,
INVENTORS.

United States Patent Office 3,146,530
Patented Sept. 1, 1964

3,146,530
PENDULOUS NORTH SEEKING GYROSCOPIC
ASSEMBLY
Keith H. Clark, 1601 5th Ave. SW., Decatur, Ala., and
James V. Johnston, 821 Giles Drive, Huntsville, Ala.
Filed Oct. 2, 1961, Ser. No. 142,450
8 Claims. (Cl. 33—226)
(Granted under Title 35, U.S. Code (1952), sec. 266)

The invention described herein may be manufactured and used by or for the Government for governmental purposes without the payment of any royalty thereon.

This invention relates to a pendulous North seeking gyroscopic assembly. Such a device is useful in the laying of missiles, in architectural work, with artillery, or in a number of other places where it is necessary to determine the direction of geodetic North.

Pendulous gyroscopic assemblies require the sensing element to be suspended with a minimum amount of friction from the suspension means. In the past, this suspension means has consisted of a thin flexible band that determined the period of oscillation and accuracy of the assembly. (Oscillations and accuracy were dependent on the distance from the top of the band to the rotating means.) These oscillations are undesirable, since they tend to create friction in the bearings that are mounted along the vertical axis and used to support the sensing element's housing. This friction tends to cause the sensing element to precess, so that the position of its direction-indicating shaft (normally horizontal with the earth's surface) is changed.

In view of these facts, an object of this invention is to provide a pendulous North seeking gyroscopic assembly in which the sensing element is supported by a gaseous bearing, that allows the assembly to be self-leveling when its level position is changed during operation of the assembly.

Another object of the invention is to provide a pendulous North seeking gyroscopic assembly that will produce the same results as the band supported type, with a reduction in overall height and an increase in ruggedness of the assembly.

Still another object of the invention is to provide an assembly that reduces the amplitude of the oscillations of the sensing element, thereby allowing quicker use of the assembly.

A further object of the invention is to provide a pendulous North seeking gyroscopic assembly utilizing liquid as a power transfer means.

Still a further object of the invention is to provide an assembly provided with means for supporting the sensing element and for maintaining the two surfaces of the gaseous bearing out of contact while the assembly is not in use.

The foregoing and other objects of this invention will become more fully apparent from the following detailed description of the invention and from the accompanying drawings, in which.

Figure 1:
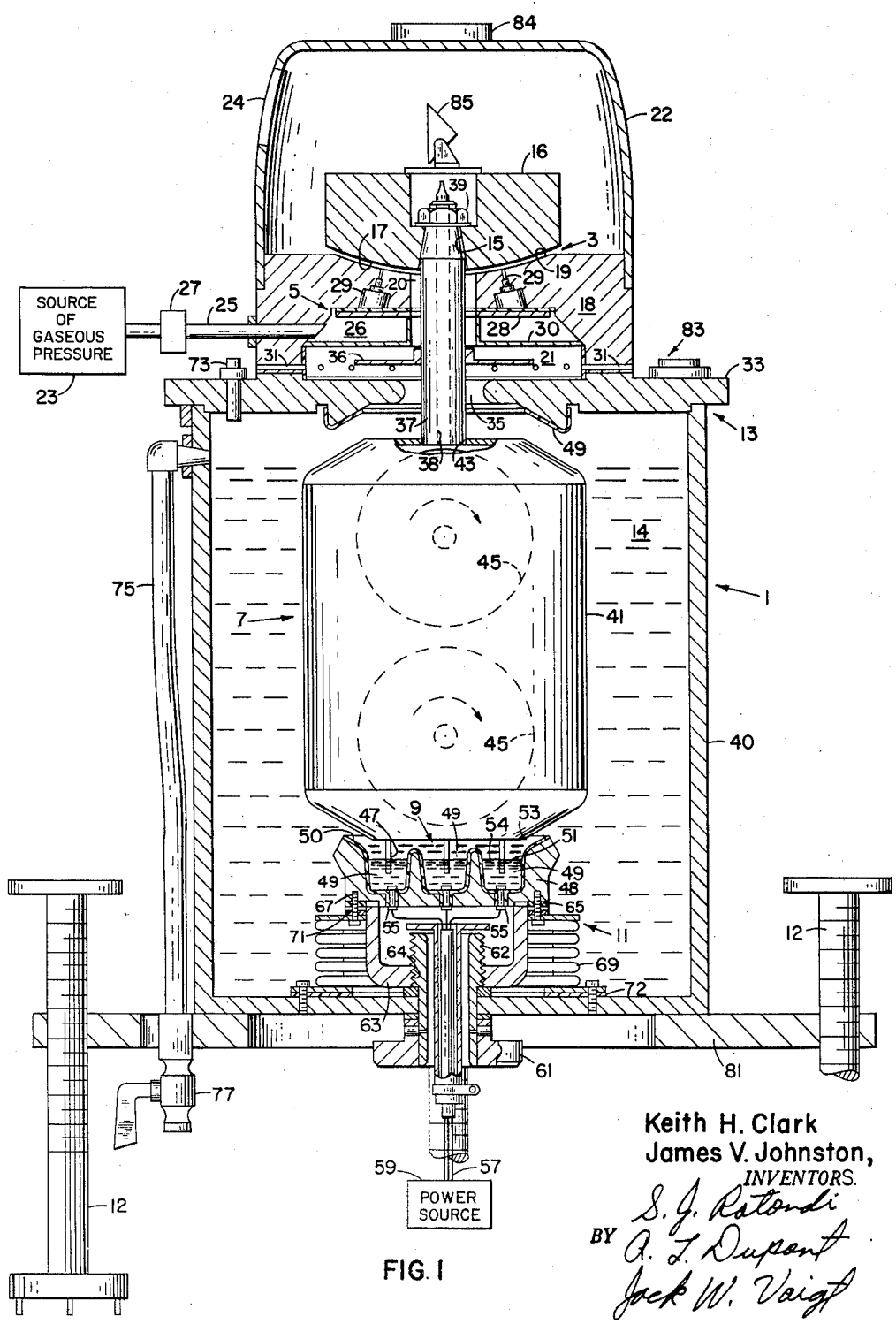
FIGURE 1 is an elevational, sectional view showing the assembly in operating position.
Figure 2:
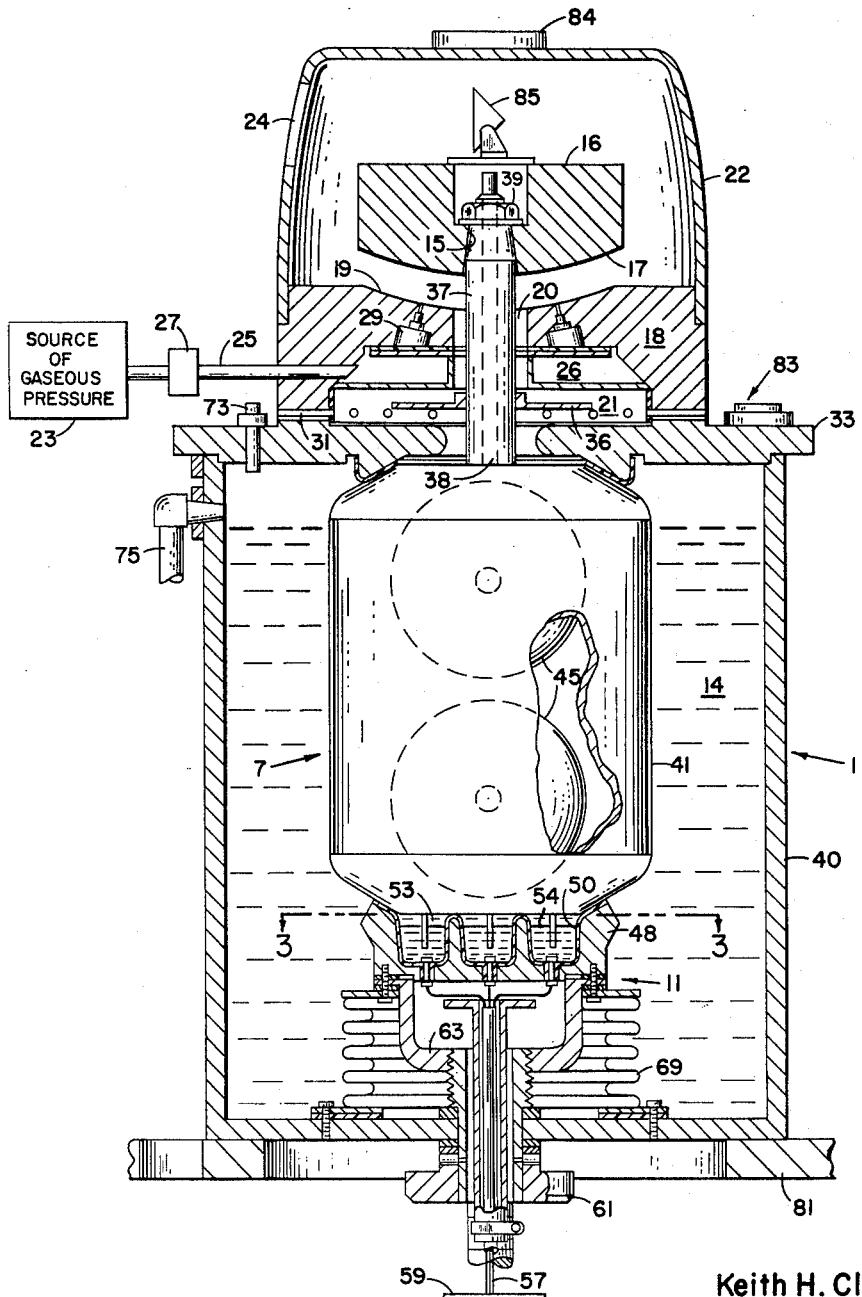
FIGURE 2 is an elevational, sectional view showing the assembly, with its sensing element maintained stationary by its supporting means, prepared for movement.

In the drawings, wherein for the purpose of illustration there is shown preferred embodiments of the invention the numeral 1 generally designates a pendulous North seeking gyroscopic assembly. The assembly shown in FIGURES 1 and 2 comprises a gaseous bearing 3, means 5 for supplying gaseous pressure to said bearing, a sensing element 7 supported at one of its ends by gaseous bearing 3, means 9 for supplying power to element 7, mechanism 11 for supporting sensing element 7 while the assembly is not in use, a sectional housing 13, means 14 enclosed by a section of housing 13 for damping the oscillations of said element, and mechanism 12 for balancing said assembly.

Gaseous bearing 3 comprises an upper section 16 having one of its surfaces provided with a convex surface 17 and a central aperture 15, a lower section 18 having one of its surfaces provided with a concave surface 19, that is machined for mating with said convex surface, and a central aperture 20 aligned with aperture 15. The lower section is also provided with a cover 22, that encloses surfaces 17 and 19, and has a glass-filled opening 24, a hollow portion 21 and a cavity 26. This portion is disposed below said concave surface, and constitutes part of the means for supplying gaseous pressure to bearing 3. The remainder of means 5 comprises a source of gaseous pressure 23 flow-connected by means of a conduit 25 to a pressure regulator 27 and to hollow portion 26. This hollow portion is provided with a plurality of ports 29, adjacent an apertured plate 28, that conduct the gaseous pressure through lower section 18 and into engagement with convex surface 17. Plate 28 is joined by a member 30 so for sealing cavity 26. This gaseous pressure is also exhausted thru aperture 20 into portion 21 which contains a second set of ports 31, that extends through section 18 radially with respect to the axis of section 18. Ports 31 serve as an escape route for the gaseous pressure and for any of fluid 14 which passes thru an aperture 35 which is disposed in alignment with aperture 20.

In order to support section 16 of bearing 3 section 18 of the gaseous bearing is secured to section 33 of sectional housing 13, thereby insuring that the pressure supplied to bearing 3 exerts a moving force on section 16. A spindle 37, which contains a central aperture 38, is extended through apertures 15, 20 and 35 and is connected to upper section 16 by any suitable means, such as a nut 39. Spindle 37 also serves as a mount for a baffle plate 36 that is disposed on the spindle slightly above ports 31 for insuring that the fluid vapor being exhausted thru ports 31 does not touch the surfaces of gaseous bearing 3. The other end of spindle 37 is secured to a housing 41 that forms part of sensing element 7 and that is enclosed by section 40 of sectional housing 13. Housing 41 is provided with a bore 43 that is adapted to receive the end of the spindle that is connected to the housing. Bore 43 is flow-connected to aperture 38, for allowing a vacuum or inert gas filler to be provided in housing 41. This vacuum or filler is maintained in housing 41 by closing the inlet to aperture 38. The remainder of the sensing element comprises electrically rotated masses or gyroscopes 45 that are rotating in the same direction and enclosed by housing 41. It is to be understood that under certain conditions these masses can be replaced by one mass. The other end of housing 41 is provided with a plurality of contacts 47, that comprise part of means 9 for supplying power to element 7, and are electrically connected to drive rotating masses 45.

Figure 3:
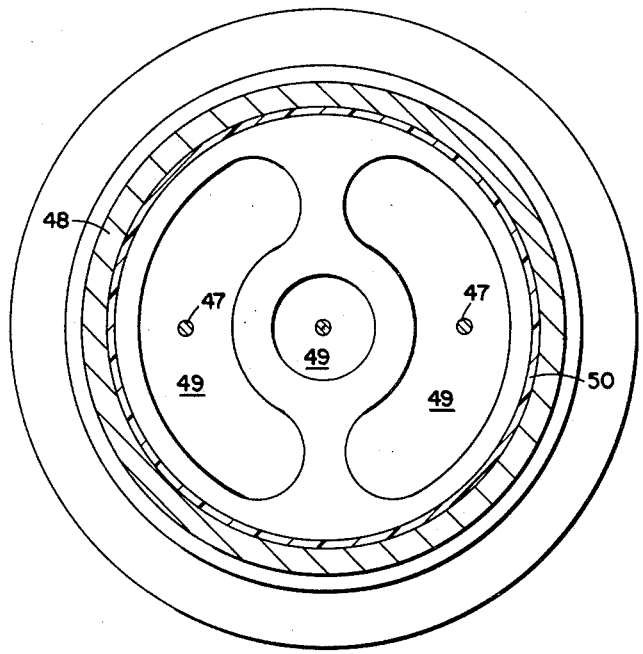
FIGURE 3 is a view, taken along line 3—3 of FIGURE 2, showing the liquid power connectors.

The remainder of the means for supplying power to element 7 is carried by a circular element 48, comprising part of mechanism 11, and consists of a plurality of recesses 49 (FIGURES 1 through 3) lined with resilient insulating material 50 and filled with mercury 51 topped by oil 53, as indicated by interface 54 a plurality of contacts 55 mounted in said recess and covered by the mercury, and a plurality of conductors 57 connecting contacts 55 to a source of power 59.

When the assembly is not in use element 48 of mechanism 11 is adapted to be moved into engagement with the base of housing 41 by rotating knob 61. Continued rotation of knob 61 will engage the top portion of housing 41 with a sloped portion 49 of section 33. This knob is connected by a threaded hollow shaft 62, or other suitable means, with a cup-shaped member 63 having a threaded central aperture 64 that coacts with the threads on shaft 62. The rim of member 63 is provided with a liquid proofing gasket 65 and is secured to part 48 of mechanism 11 by screws 67, or other suitable means. These screws also serve to attach one end of a liquid proofing bellows 69 and attached gasket 71 to part 48. The other end of bellows 69 and a gasket 72 is secured to section 40 of housing 13. This arrangement insures that power conductors 57 are kept dry and that means 14, enclosed by housing 13, for damping the oscillations of element 7 is maintained in housing 13.

Damping means 14 is preferably a light weight oil, but it is to be understood that other liquids can be used for providing damping of the oscillations of element 7. This damping means also serves a second purpose of providing buoyancy to sensing element 7, thereby giving gaseous bearing 3 the advantage of operating with less pressure. Means 14 also provides the advantage of stabilizing the temperature of the assembly. In order to place the damping means in housing 13, a filler nozzle 73 is disposed in section 33 of the housing. To provide for expansion of damping means 14, after it is placed in housing 13, and for insuring that the housing is filled to the proper level, an overflow tube 75 and combined control valve 77 is flow-connected to housing 13 juxtaposed to the union of sections 33 and 40.

For supporting and balancing the assembly, a plurality of adjusting legs 12 are connected to a plate 81, that serves as a stand for housing section 40, and a level indicator 83 is secured to section 40. Housing section 40 is rotatably secured to plate 81, so that the assembly can be roughly aligned with magnetic North by using compass 84. When it is desired to obtain geodetic North a surveying instrument (not shown) is used with a porro prism 85, mounted on section 16 of bearing 3 behind opening 24, as explained in the operation.

The operation of this embodiment is as follows:

The assembly is placed in a substantially level position by using legs 12 and level 83 (the assembly does not have to be exactly level, since gaseous bearing 3 can compensate for small amounts that the assembly is off from a level position). With the assembly substantially level housing 40 is rotated (if necessary) on base 81 until the assembly is roughly aligned with magnetic North as indicated by compass 84, power is supplied to the rotating masses (or mass if only one is used) and the masses are allowed to reach the required operating speed. As soon as the masses reach the required speed gaseous pressure is supplied to gaseous bearing 3 by operating pressure regulator 27 and the supporting mechanism 11 is removed from its engagement with the housing of sensing element 7 by rotating knob 61 until the gaseous bearing supports the sensing element.

When the sensing element is released it begins to rotate about its vertical axis. This rotation will continue until the earth's rate component is equal to the torque on the output of the sensitive axis. When this condition is reached the sensing element will reverse its rotation about its vertical axis and swing in the opposite direction until the above equalization is reached. These oscillations (rotations of the sensing element about its vertical axis) can be measured by using an instrument, such as a standard surveying instrument (not shown), for measuring the angle through which the sensing element rotates. This instrument is placed in line with opening 24 and porro prism 85, and a minimum of three reversal points of the sensing element are obtained by measuring the points with the instrument and reading them from a scale on the instrument. An indication of geodetic North is obtained by setting the instrument at the average reading between the reversal points.

Figure 4:
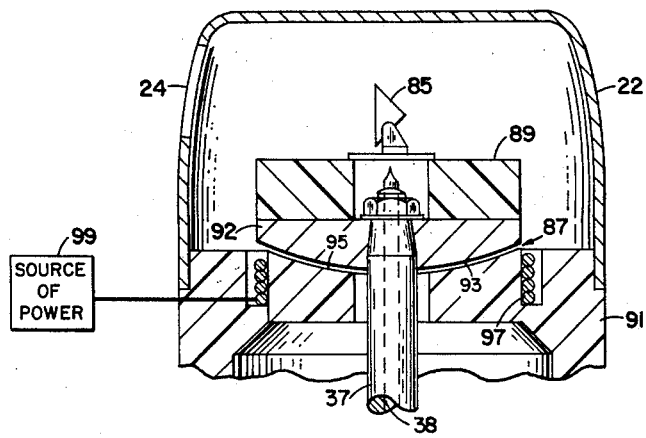
FIGURE 4 is a view, partly broken away, showing a second form of the bearing used to support the sensing element when the assembly is in operation.

The structure of FIGURE 4 comprises a bearing 87 having an apertured upper section 89 and an apertured lower section 91. The upper section comprises a permanent magnet 92 and a convex surface 93 formed on one side. The lower surface is provided with a concave surface 95, adapted to mate with surface 93, and an electromagnet 97 having a characteristic that causes magnet 97 to repel permanent magnet 92. The operation of this form is the same as the form shown in FIGURES 1 through 3, except that the gaseous pressure is replaced by an electrical power source 99 that provides the power to magnet 97, thereby creating a bearing between sections 89 and 91 due to the electromagnet repelling the permanent magnet.

It is to be understood that the forms of the invention that are herein shown and described are the preferred embodiments, and that various changes in the shape, size and arrangement of parts may be resorted to without departing from the spirit of the invention, or the scope of the subjoined claims.

The following invention is claimed:

1. A pendulous North seeking gyroscopic assembly comprising: a self-leveling bearing having a convex movable section and a concave stationary section disposed below said convex section; a housing supporting said stationary section of said bearing; a sensing element disposed in said housing and supported by said bearing wherein said element is free to oscillate and is leveled by said bearing, said sensing element being disposed below said bearing; means disposed below said sensing element and enclosed by said housing for supplying power to said element; mechanism for supporting and maintaining said element in a stationary position while the assembly is not in operation; means maintained in said housing in contact with said sensing element for damping the oscillations of said sensing element and for providing buoyancy to said element; and means for substantially leveling said assembly.

2. A device as set forth in claim 1, in which said sensing element comprises a plurality of rotating masses; and a housing enclosing said masses.

3. A device as set forth in claim 1, in which said means for supplying power to said sensing element comprises a plurality of contacts having one end electrically connected to said element; a plurality of recesses movable in relation to said sensing element disposed for receiving the other end of said contacts; liquid conducting means maintained in said recesses in contact with the other end of said contacts and in contact with said means for damping the oscillations of said sensing element and for providing buoyancy to said element; a second set of contacts having one end disposed in said recesses in contact with said liquid conducting means and the other end extending externally of said recesses; and a source of power electrically connected to said other end of said second set of contacts.

4. A device as set forth in claim 1, in which said mechanism for maintaining said sensing element in a stationary position while the assembly is not in operation comprises a substantially circular element having a section sloped toward its axis; a movable cup-shaped member having one end rigidly connected to said circular element; a resilient insulating member disposed along the surface of said circular element that is opposite from the connection between said circular element and said cup-shaped member; means for liquid-proofing said connection between said circular element and said cup-shaped member; mechanism coacting with said cup-shaped member for moving said circular element into engagement with one end of said sensing element; and a second sloped section formed in said housing for coacting with the other end of said sensing element.

5. A device as set forth in claim 1, in which said damping means comprises a liquid enclosed by said housing.

6. A device as set forth in claim 1, in which said means for substantially leveling said assembly comprises a plurality of adjustable legs and a level indicating means.

7. A device as set forth in claim 1, in which said bearing is produced by a pair of magnets one in each of said sections having the characteristics of repelling each other, whereby a space is formed between said sections.

8. A pendulous North seeking gyroscopic assembly comprising: a bearing having a movable section and a stationary section; means for providing power to said bearing wherein said movable section is separated from said stationary section; a plurality of rotating masses disposed below said bearing for support by said bearing and for oscillation about the axis of their support; means for enclosing said masses; means for providing operating power for said masses; mechanism disposed for movement into supporting engagement with said means for enclosing said masses; a housing disposed for supporting said stationary section of said bearing, said housing enclosing said mechanism and said means for enclosing said masses; means disposed in said housing for damping the oscillations of said masses and for providing buoyancy to said means enclosing said masses; and means for leveling said assembly.

References Cited in the file of this patent

UNITED STATES PATENTS

| | | |
|---|---|---|
| 1,180,815 | Anschutz-Kaempfe | Apr. 25, 1916 |
| 1,201,139 | Bodde et al. | Oct. 10, 1916 |
| 1,250,592 | Klahn | Dec. 18, 1917 |
| 1,496,150 | Davis | June 3, 1924 |
| 1,589,039 | Anschutz-Kaempfe | June 15, 1926 |
| 1,644,921 | Henderson | Oct. 11, 1927 |
| 1,707,475 | Henderson | Apr. 2, 1929 |
| 2,556,253 | Blair et al. | June 12, 1951 |
| 2,797,581 | Carter | July 2, 1957 |
| 2,811,785 | Bradden et al. | Nov. 5, 1957 |
| 2,886,897 | Beach | May 19, 1959 |
| 2,930,240 | Rellensmann et al. | Mar. 29, 1960 |
| 2,966,744 | Mueller | Jan. 3, 1961 |
| 2,972,195 | Campbell et al. | Feb. 21, 1961 |

FOREIGN PATENTS

| | | |
|---|---|---|
| 8,394 | Great Britain | 1884 |
| 146,372 | Great Britain | May 26, 1921 |
| 508,034 | Germany | Sept. 23, 1930 |
| 842,272 | Germany | Dec. 18, 1952 |
| 768,000 | Germany | May 5, 1955 |